Nov. 21, 1967  A. K. LYLE  3,353,514
APPARATUS FOR APPLYING COATINGS TO ARTICLES OF GLASSWARE
Filed Dec. 9, 1964  2 Sheets-Sheet 1

INVENTOR.
AARON K. LYLE
BY *McCormick, Paulding & Huber*
ATTORNEYS

Nov. 21, 1967   A. K. LYLE   3,353,514
APPARATUS FOR APPLYING COATINGS TO ARTICLES OF GLASSWARE
Filed Dec. 9, 1964   2 Sheets-Sheet 2
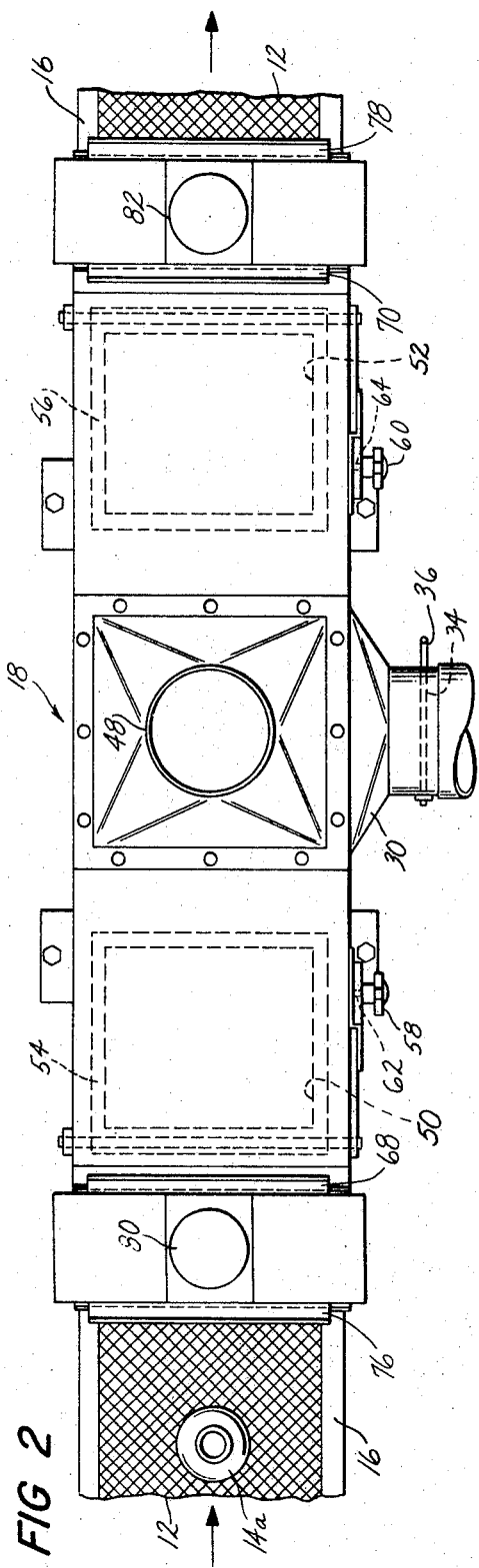
FIG 2
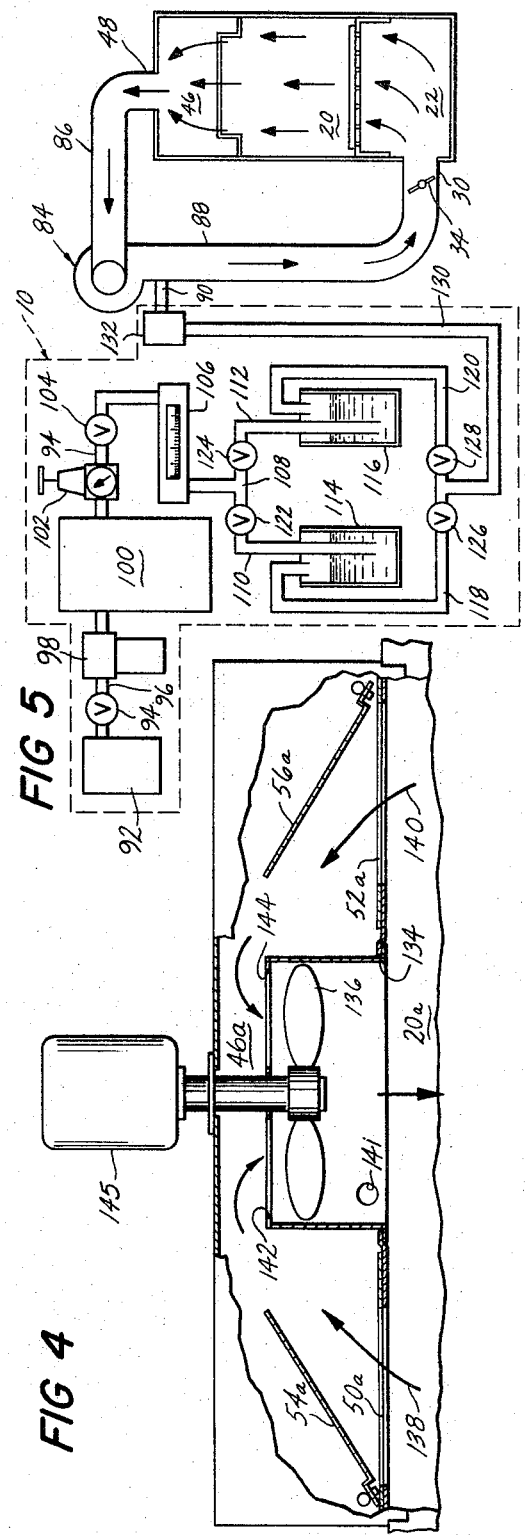
FIG 5
FIG 4

3,353,514
APPARATUS FOR APPLYING COATINGS TO ARTICLES OF GLASSWARE
Aaron K. Lyle, West Hartford, Conn., assignor to Emhart Corporation, Bloomfield, Conn., a corporation of Connecticut
Filed Dec. 9, 1964, Ser. No. 417,040
12 Claims. (Cl. 118—49)

ABSTRACT OF THE DISCLOSURE

Apparatus for applying coatings to glassware comprising a coating chamber with inlet and outlet openings and a conveyor belt carrying articles of glassware through the chamber, air moving and controlling apparatus for vapor carrying air including valves for independently controlling separate flow streams interiorly across the openings to compensate for drift and prevent air flow through the openings.

---

This invention relates to apparatus for applying coatings to articles of glassware and, more particularly, to apparatus for applying "invisible iridizing" coatings. "Iridizing coating" derives its name from the fact that the glass article becomes more or less iridescent if the coating is sufficiently thick. "Invisible iridizing" coatings are referred to here as the apparatus is intended for use particularly in the application of "iridizing" coatings less than one-fourth wave length in thickness. Such coatings are substantially invisible to the naked eye.

My prior Patent 2,375,482 granted May 8, 1945, entitled, "Apparatus for Coating Glass Articles," discloses a method and apparatus for producing "iridizing" coatings in the laboratory.

It is the general object of the present invention to provide a commercial apparatus which is particularly well adapted to high speed operation wherein bottles or other articles of glassware may be handled at the "hot end" as they come from a forming machine and wherein the application of the "iridizing" coating is yet accomplished in a highly efficient and economic manner.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 2 is a top view of the apparatus of FIG. 1.

FIG. 4 is a side view partially in section and showing a second form of an apparatus constructed in accordance with the present invention.

FIG. 5 is a schematic illustration showing various conduits, valves, etc., which form part of the apparatus of the invention and which may be employed with either form of the invention.

Figures 1, 3:
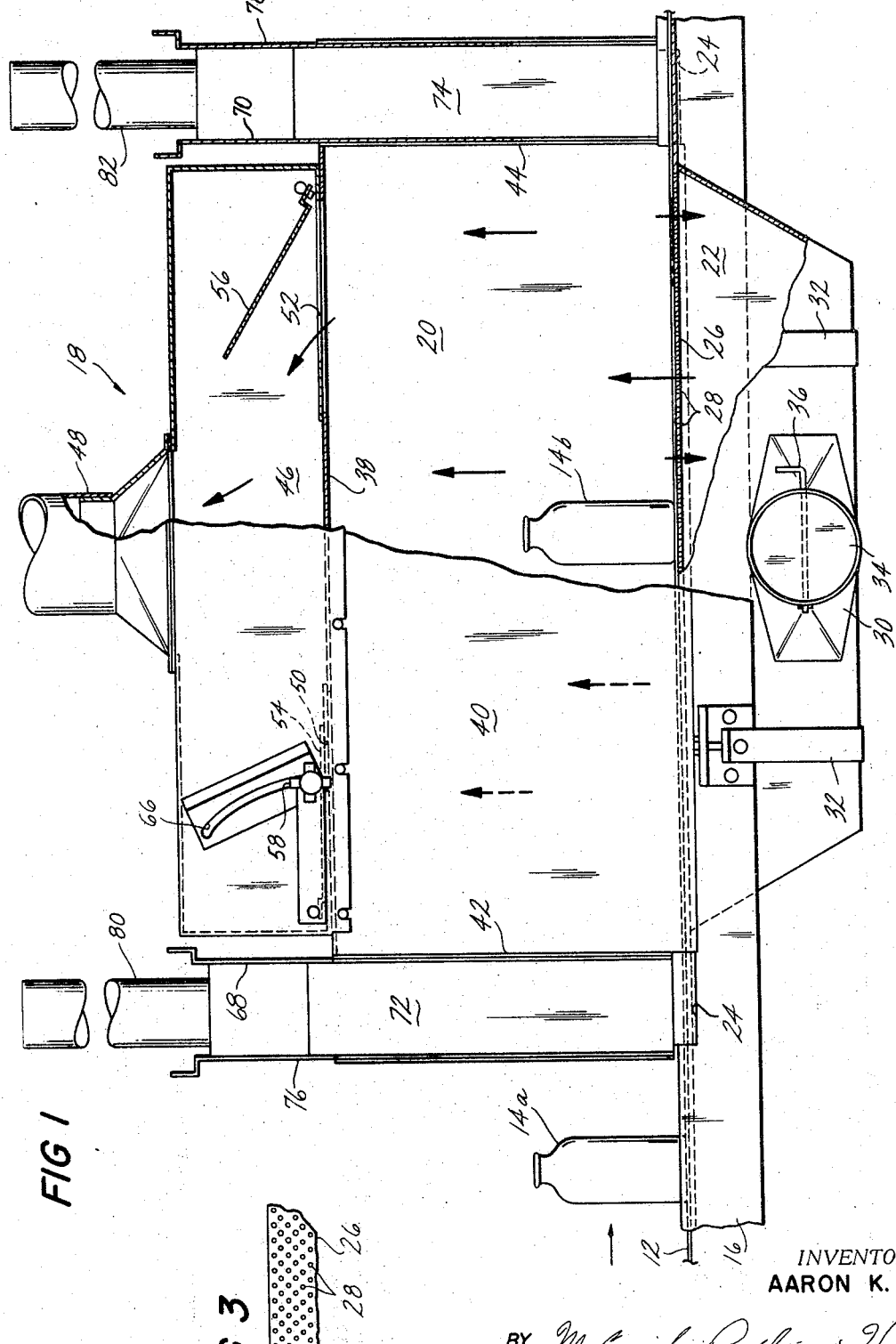
FIG. 1 is a side view partially broken away showing a first form of an apparatus constructed in accordance with the invention.
FIG. 3 is a fragmentary sectional view taken approximately as indicated at 3—3 in FIG. 1.

"Invisible iridizing" of articles of glassware has been found to provide significant advantages. In the case of bottles for holding beverages a substantial improvement in bursting strength has been achieved and this improvement has reached a level as high as 20 to 25 percent. In addition, the lubricity of articles of glassware is greatly enhanced. Bottles and other containers with "invisible iridizing" coatings do not tend to adhere or scratch one another, particularly if they have been treated with a temporary lubricant such as is normally employed.

The coating material employed in "invisible iridizing" may vary somewhat but stannic chloride ($SnCl_4$) or titanium chloride ($TiCl_4$) is preferably used, with stannic chloride being presently preferred over titanium chloride. A pressurized source of dry air carrying stannic chloride vapor is indicated generally at 10 in FIG. 5 and is usable with equal convenience with a first form of the apparatus of the invention shown in FIGS. 1 to 3 and with a second form of the apparatus shown in FIG. 4. In each of the two forms of the apparatus of the invention a coating chamber is provided and is adapted for the movement of articles of glassware therethrough on a conveyor and for the introduction thereto of a comparatively large volume of air in a closed loop or recirculation path of flow. The air which recirculates or flows in the closed loop passes over the articles of glassware in the coating chamber and air from the aforesaid pressurized source of air carrying vaporized coating material is mixed with the closed loop air flowing over the articles of glassware so as to apply the vapor to the articles. In each form of the invention air flows generally normal to the direction of conveyor movement, or it may be said that air flows generally vertically adjacent inlet and discharge openings of the coating chamber whereby to assist in retaining the coating material vapor within the chamber and to prevent such vapor from reaching an operator of the apparatus. It will be understood that the phrases "generally vertical air flow" and the like are used herein and in the claims which follow for convenience only, and that air flow across the ware inlet and discharge openings in any direction is to be covered thereby. Still further, first and second valve means or adjustable baffles are provided for independently controlling the vertical flow of air adjacent the inlet and discharge openings of the coating chamber whereby to control drift and prevent flow through the openings and, optionally, there may be provided exhaust chambers disposed adjacent and outwardly of said openings and which operate further to insure against the escape of vapor or fumes from the coating chamber.

Referring now particularly to FIGS. 1 through 3 and 5 and considering the first form of the apparatus of the invention, a generally horizontally extending conveyor will be observed at 12. The conveyor 12 is illustrated as transporting a series of articles of glassware such as bottles 14a, 14b in an upright attitude from left to right in FIGS. 1 and 2. The conveyor is shown supported for movement on and above a channel member 16 and may be driven in appropriate and conventional manner. As best illustrated in FIG. 2, the conveyor comprises a wire mesh belt of a type conventionally used for transporting articles of glassware while they are still hot between the forming machine and the annealing lehr.

A housing 18 defines a coating chamber 20 above the conveyor 12 and a plenum chamber 22 beneath the said conveyor. As shown, the channel 16 has a central portion thereof beneath the conveyor 12 which constitutes a top wall 26 of the plenum chamber 22. The top wall 26 of the plenum chamber has at least one opening therein for the upward passage of air therethrough and, as shown, the said wall is provided with a plurality of small openings 28, 28, FIG. 3. The openings 28, 28 are so arranged and the aggregate area thereof is such as to provide for a slight build-up of air pressure beneath the said wall and for a substantially uniform distribution of air upwardly through the said openings and throughout the area of the wall.

Thus, air is permitted to flow upwardly from the plenum chamber 22 in substantially uniform distribution throughout the horizontal extent of the coating chamber 20. An inlet connection 30 is provided in a side wall of the plenum chamber 22 and suitable means 32, 32 are preferably provided for connection of the plenum chamber with the aforesaid channel member 16. A valve means 34 shown disposed in the inlet connection for the plenum chamber 22 has connected therewith a manually operable lever 36. Adjustment of the position of the valve means 34 can of course be effected to vary the inflow of air to the plenum chamber 22 and thus to vary the upward discharge of air from the chamber through the openings 28, 28 in the top plate 26 to the coating chamber 20.

The coating chamber 20 has a top wall 38, opposite side walls 40, 40, an inlet opening 42 at the left-hand portion thereof and an outlet or discharge opening 44 at the right-hand portion thereof. Thus, articles of glassware such as the bottles 14a, 14b are free to move through the coating chamber from left to right on the conveyor 12 and air flows generally vertically upwardly thereover with coating material in vapor form reacting with the hot glass surfaces to form a coating thereon.

Disposed above the coating chamber 20 is an air discharge chamber 46 having a discharge connection at 48 and having left and right-hand or first and second inlet openings 50, 52 in a bottom wall thereof formed by the aforesaid top wall 38 of the coating chamber 20. Air from the coating chamber 20 flows generally vertically adjacent the inlet opening 42 of the coating chamber and through the inlet opening 50 to the discharge chamber 46 whereas air at a right-hand portion of the coating chamber 20 flows in a generally vertical stream upwardly and through the inlet opening 52 to the said chamber 46. First and second or left and right-hand valve means comprising valve members 54, 56 are operatively associated respectively with the left and right-hand inlet openings 50, 52 and with the generally vertical air streams passing upwardly through the coating chamber 20 and the said openings. Other valve arrangements may be provided but in the preferred form, the valves 54, 56 are pivotally supported and provided with manually operable knobs 58, 60 for fixing the valve members in selected position. The knobs 58, 60 have small stems 62, 64 which extend through suitable arcuate slots, one shown at 66, into connecting engagement with the respective valve members. Thus, the valves 54, 56 may be adjusted as desired to control upward air flow through the upper portion of the coating chamber 20. At a lower portion of the said chamber, air flow is substantially evenly distributed horizontally as mentioned above.

As shown, the left-hand valve 54 is in a closed position and the right-hand valve 56 is in an open position such that substantially all of the air discharged from the coating chamber 20 passes through the inlet opening 52 to the discharge chamber 46 and the discharge connection 48. This arrangement of the valves is preferred when a draft is encountered from right to left; that is, when an external flow of air tends to enter the discharge opening 44 of the coating chamber 20 and pass leftwardly toward the inlet opening 42. While fumes might otherwise escape from the coating chamber 20 through the inlet opening 42 under such conditions of operation, the discharge of all of the coating chamber air through the opening 52 tends to overcome this tendency and the vapor or fumes pass upwardly as desired through the opening 52 and the chamber 46 to the discharge connection 48. Conversely, a draft from left to right might cause vapor or fumes to be discharged from the discharge opening 44 of the coating chamber 20. When this condition of operation is encountered, the valve 54 may be opened and the valve 56 closed or partially closed so as to provide for all or a major portion of the air flow upwardly through the inlet opening 50 to the discharge chamber 46 and the discharge connection 48. This tends to overcome the tendency of left to right "drift" of vapor or fumes and to prevent the escape of fumes from the coating chamber 20. Still further, and under substantially draft-free conditions of operation, the valves 54 and 56 may be equally opened as to a partially open condition or to a fully open condition and efficient operation will be achieved with the air flow passing equally through the openings 50 and 52 to the chamber 46 and the discharge connection 48.

Further with regard to the prevention of the outward flow of fumes from the coating chamber 20, first and second gates are preferably provided adjacent the inlet and discharge openings 42, 44 of the chamber. Thus, a gate 68 is vertically movable adjacent the inlet opening 42 so as to be positioned in close proximity to the top of an article of glassware such as 14a passing thereunderneath. Similarly, a gate 70 adjacent the discharge opening 44 is adjustable vertically so as to be arranged at substantially the same height as the gate 68.

While not essential in all installations, first and second exhaust chambers 72, 74 are preferably provided respectively adjacent the gates 68 and 70. The exhaust chamber 72 has a gate 76 associated therewith and which is adapted for vertical movement and arrangement in close proximity to the top of articles of glassware passing thereunderneath. A gate 78 associated with the exhaust chamber 74 is similarly adjustable and adapted to be fixed in selected position. Similar exhaust stacks 80, 82 are preferably provided respectively at the tops of the chambers 72 and 74 to assist in the provision of an upward air flow in each of said chambers. When the apparatus is in operation an upward air flow occurs in the chambers 72 and 74 with outside air being drawn into the chambers and the said air flows act somewhat in the manner of elementary air screens to assist in the prevention of the out flow of fumes from the coating chamber.

As mentioned above, air flow in a closed loop or recirculating path is provided for in accordance with the invention and air moving means is of course required. A power operated air moving and controlling means is best illustrated schematically in FIG. 5 wherein a blower is shown at 84 in diagrammatic form. The aforementioned discharge connection 48 extends through an air passageway means or conduit 86 to the blower 84 and an inlet passageway 88 extends to the inlet connection 30 for the plenum chamber 22. The aforementioned inlet valve 34 is shown controlling the air flow in the closed loop or recirculating path and a conduit 90 is shown connecting the aforementioned source of pressurized dry air and coating material vapor with the inlet passageway 88.

The source of pressurized dry air and coating material vapor 10 may vary widely but is shown in accordance with the presently preferred practice as comprising a source of pressurized air 92 which has an associated shutoff valve 94 disposed in a conduit 96 extending to a filter 98 and a dryer 100, which may be a type B–6–A Lectrodryer manufactured by McGraw Edison Company. From the dryer 100 the conduit 94 extends to a pressure regulating valve and gage 102 and thence to a control valve 104. An air flow indicator is preferably provided at 106 preceding a junction 108 where the conduit 94 meets with branch conduits 110 and 112 extending respectively to similar reservoirs 114, 116. The reservoirs 114 and 116 contain liquid stannic chloride and the conduits 110 and 112 extend into the reservoir so as to cause the air discharged therefrom to bubble through the stannic chloride and provide stannic chloride in vapor form alternatively in the reservoir discharge conduits 118, 120. Inlet shut-off valves are preferably provided in the branch conduits 110 and 112 at 122 and 124 and outlet shut-off valves may be provided in the branch conduits 118, 120 at 126 and 128 as shown. Extending from the outlet shut-off valves is a conduit 130 which carries pressurized air and coating material in vapor form to a visual test valve 132 and thence to the conduit 90 and the inlet passageway 88 for the plenum chamber 22.

From the foregoing it will be apparent that pressurized air carrying coating material in vapor form is supplied to the inlet passageway 88 for delivery to the plenum chamber 22 and the coating chamber 20 under the control of the valve 104. Thus, the concentration of vapor or fumes in the closed loop or recirculating air path is regulable for control over the thickness of application of coating material to the glassware in the coating chamber 20. Moreover, control of the aggregate air flow through the plenum chamber 22, the coating chamber 20, the discharge chamber 46 and throughout the closed loop is effected by the aforementioned valve 34.

Referring now to FIG. 4, a coating chamber 20a partially shown, may be substantially identical with the coating chamber of FIGS. 1 through 3 except for the provision of an additional opening 134 in its top wall and the provision of an imperforate bottom wall. That is, no plenum chamber such as the chamber 22 is employed in the apparatus of FIG. 4 and the central portion of the channel 16 is left intact beneath the conveyor 12. Thus, the coating chamber 20 may be said to have an imperforate bottom wall.

The arrangement of first and second valves 54a and 56a may be identical with the arrangement described above for the valves 54 and 56. Thus, a closed loop or recirculating air path is provided within the coating chamber 20a and the discharge chamber 46a of FIG. 4. An air moving means in the form of a fan 136 may be adapted in a first alternative form to discharge air axially downwardly through the opening 134 and into the coating chamber 20a. As the air reaches the imperforate bottom wall of the coating chamber 20a it will split into left and right-hand vertically rising columns of air as indicated by the arrows 138 and 140. The columns or streams of air 138, 140 move upwardly through the openings 50a, 52a under the control of the valve members 54a and 56a. In the chamber 46a, the air passes through openings 142, 144 for repeated downward movement at the urging of the fan 136.

In a second alternative embodiment, a centrifugal fan may be provided at 136 and the air may be thrown generally radially outwardly through appropriate openings and thence downwardly through the openings 50a and 52a to provide vertically downwardly moving air streams adjacent the inlet and discharge openings of the coating chamber and to provide an upwardly moving air stream at a central portion of the coating chamber. Thus, in either alternative embodiment a vertically moving air stream is provided at a central portion of the coating chamber in one direction and generally vertically moving streams are provided on either side thereof in an opposite direction adjacent the inlet and discharge openings of the coating chamber.

For supply of pressurized air carrying coating material in vapor form, an inlet opening is preferably provided at 141 and may be connected with the aforementioned conduit 90 leading from the source of pressurized air and vaporized coating material 10.

An electric drive motor 145 is shown for the fan 136 and in order to provide for control over the air flow within the coating chamber 20 in this embodiment of the invention, the drive motor 145 may be of the variable speed type.

From the foregoing it will be apparent that each apparatus of the present invention provides for a high degree of efficiency and economy in operation. The closed loop or recirculating air path characteristics of each apparatus contributes substantially to these advantages. Air passing through the coating chamber is maintained in a desirably dry condition, the vaporized coating material is re-used so as to avoid undue waste, and unique provisions are made for the efficient confinement of the vapor or fumes within the coating chamber.

The invention claimed is:

1. Apparatus for applying inorganic coatings to articles of glassware comprising a generally horizontal conveyor adapted to transport glassware in an upright attitude, a housing defining a coating chamber above the conveyor, said chamber having a top wall and opposing side walls and inlet and discharge openings at opposite ends for the passage of glassware through the chamber on the conveyor, power operated air moving and controlling means in communication with said coating chamber and arranged to provide air flow in a closed loop with air passing generally normal to the direction of movement of the conveyor over glassware in the coating chamber and with first and second air streams generally normal to the conveyor created in the chamber respectively adjacent said inlet and discharge openings, first and second adjustable baffle means located out of the passage of the glassware and disposed respectively adjacent said inlet and discharge openings in the coating chamber and operable respectively on said first and second air streams adjacent the openings whereby independently to adjust the air streams and thereby effect drift control and prevent flow through the openings, and a pressurized source of dry air carrying inorganic coating material in vapor form in communication with said coating chamber and with the air flowing therein so as to be mixed with said air and reactively applied to the glassware in the chamber.

2. Apparatus for applying inorganic coatings to articles of glassware as set forth in claim 1 wherein said air moving and controlling means includes means for varying the quantity of air flow over the glassware in the coating chamber.

3. Apparatus for applying inorganic coatings to articles of glassware as set forth in claim 1 and including means operatively associated with said pressurized source of dry air carrying coating material for varying the amount of such air and coating material introduced to the coating chamber.

4. Apparatus for applying inorganic coatings to articles of glassware comprising a generally horizontal perforate conveyor adapted to transport glassware in an upright attitude, a housing means defining coating and plenum chambers respectively above and beneath the conveyor, said coating chamber having a top wall and opposing side walls and inlet and discharge openings at opposite ends for the passage of glassware through the chamber on the conveyor, and said plenum chamber having at least one opening at the top, air passageway means and power operated air moving means in communication with said coating and plenum chambers and arranged to provide air flow in a closed loop to the plenum chamber, upwardly therefrom through the perforate conveyor, and generally normal to the direction of movement of the conveyor upwardly over glassware in the coating chamber and thence to the air moving means, first and second adjustable baffle means located out of the passage of the glassware and disposed respectively adjacent said inlet and discharge openings in the coating chamber to prevent flow through the openings and a pressurized source of dry air carrying inorganic coating material in vapor form in communication with said coating chamber so as to be mixed with the air flowing therethrough and reactively applied to the glassware therein.

5. Apparatus for applying inorganic coatings to articles of glassware as set forth in claim 4 wherein said plenum chamber is provided with a top wall having a plurality of small openings distributed throughout to provide for substantially uniform distribution of upward air flow through the wall.

6. Apparatus for applying inorganic coatings to articles of glassware as set forth in claim 5 wherein there is provided a valve means in said air passageway means for controlling air flow from the air moving means to said plenum chamber and thence to the coating chamber.

7. Apparatus for applying inorganic coatings to articles of glassware as set forth in claim 5 wherein said source of pressurized dry air carrying coating material communicates with said air passageway means for indirect communication with said coating chamber through said passageway means and the plenum chamber, and wherein there is provided a means operatively associated with said pressurized source of air for varying the amount of such air and coating material introduced to the air passageway means.

8. Apparatus for applying inorganic coatings to articles of glassware as set forth in claim 5 wherein first and second gates are provided respectively adjacent the aforesaid inlet and discharge openings of said coating chamber, said gates being adjustable vertically so as to be positioned in close proximity to the tops of articles of glassware passing therebeneath on the conveyor.

9. Apparatus for applying inorganic coatings to articles of glassware as set forth in claim 8 wherein first and second exhaust chambers are provided respectively adjacent said first and second gates, each of said exhaust chambers including top openings for venting excess fumes from the coating chamber.

10. Apparatus for applying inorganic coatings to articles of glassware as set forth in claim 9 wherein each of said exhaust chambers is provided with a gate which is vertically adjustable for positioning in close proximity to glassware passing therebeneath, said gates being separate from and independently operable with respect to said first and second gates.

11. Apparatus for applying inorganic coatings to articles of glassware comprising a generally horizontal conveyor adapted to transport glassware in an upright attitude, a housing means defining a coating chamber above the conveyor, said chamber having top and bottom walls and opposing side walls and inlet and discharge openings at opposite ends for the passage of glassware through the chamber on the conveyor, power operated air moving means disposed above and in communication with said coating chamber at least approximately at a central location and arranged to provide air flow in a closed loop with air passing generally normal to the direction of conveyor movement and over glassware in one direction at a central portion of the coating chamber and with air streams moving generally normal to the direction of conveyor movement and in a direction opposite the flow at said central portion in the chamber respectively adjacent said inlet and discharge openings, and a pressurized source of dry air carrying inorganic coating material in vapor form in communication with said coating chamber and with the air flowing therein so as to be mixed therewith and reactively applied to the glassware in the chamber.

12. Apparatus for applying inorganic coatings to articles of glassware comprising a generally horizontal conveyor adapted to transport glassware in an upright attitude, a housing means defining a coating chamber above the conveyor, said chamber having top and bottom walls and opposing side walls and inlet and discharge openings at opposite ends for the passage of glassware through the chamber on the conveyor, power operated air moving means disposed above and in communication with said coating chamber at least approximately at a central location and arranged to provide air flow in a closed loop with air passing generally normal to the direction of conveyor movement over glassware in one direction at a central portion of the coating chamber and with first and second air streams moving in an opposite direction in the chamber generally normal to conveyor movement respectively adjacent said inlet and discharge openings, first and second valve means disposed respectively adjacent said inlet and discharge openings in the coating chamber and operable respectively on said first and second air streams adjacent the openings whereby indepently to adjust the air streams and thereby effect drift control and prevent flow through the openings, and a pressurized source of dry air carrying inorganic coating material in vapor form in communication with said coating chamber and with the air flowing therein so as to be mixed therewith and reactively applied to the glassware in the chamber.

References Cited

UNITED STATES PATENTS

| | | | |
|---|---|---|---|
| 2,365,890 | 12/1944 | McBean | 34—46 XR |
| 2,671,739 | 3/1954 | Lander | 118—49 XR |
| 2,674,553 | 4/1954 | Schnitzler | 118—49 XR |

CHARLES A. WILLMUTH, *Primary Examiner.*

R. I. SMITH, *Assistant Examiner.*